Oct. 27, 1931.  B. E. CLARKSON  1,829,264
ANIMAL TRAP
Filed Oct. 1, 1930    2 Sheets-Sheet 1

Inventor
B.E.Clarkson
By CA Snow & Co.
Attorneys.

Oct. 27, 1931.   B. E. CLARKSON   1,829,264
ANIMAL TRAP
Filed Oct. 1, 1930   2 Sheets-Sheet 2

Inventor
B. E. Clarkson
By C A Snow Co.
Attorneys.

Patented Oct. 27, 1931

1,829,264

UNITED STATES PATENT OFFICE

BOWEN E. CLARKSON, OF KINGSTREE, SOUTH CAROLINA

ANIMAL TRAP

Application filed October 1, 1930. Serial No. 485,781.

This invention relates to animal traps, and more particularly to animal traps of the self setting and everset type.

The primary object of the invention is to provide a trap of this character including a rotary closure normally held in its open position and closed by the movement of the bait pan, means being provided for causing the closure to move to its open position after the animal passes from the trap into the cage, forming a part of the trap.

Another object of the invention is to provide means for adjusting the closure operating means so that it will be exceptionally sensitive, to the end that the trap may be used for trapping small animals.

With the foregoing and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings.

Figure 1:
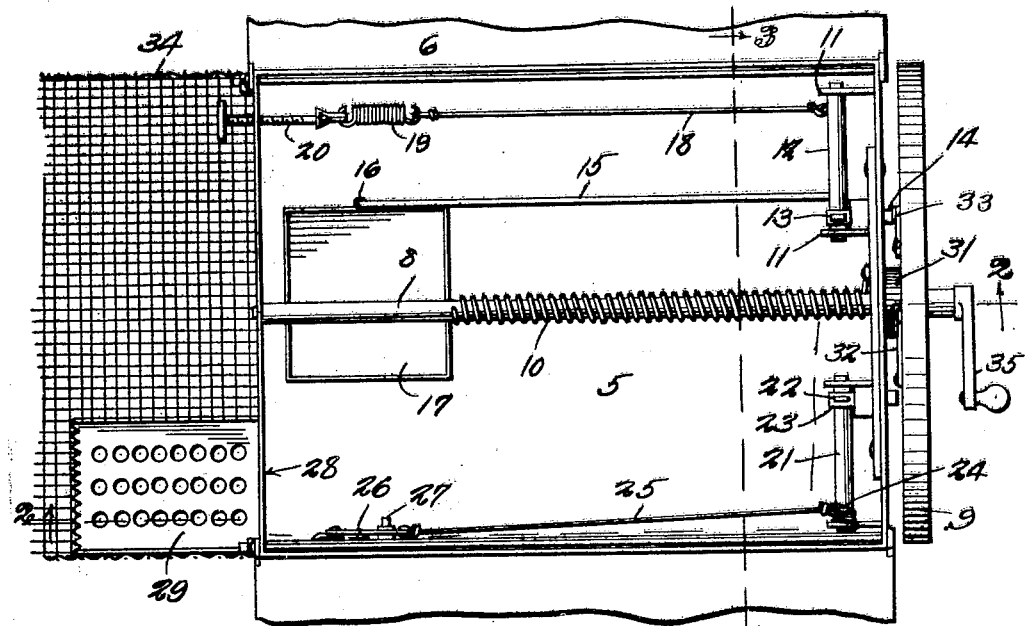
Figure 1 is a plan view of the trap, the cover thereof being shown in its open position.
Figure 2:
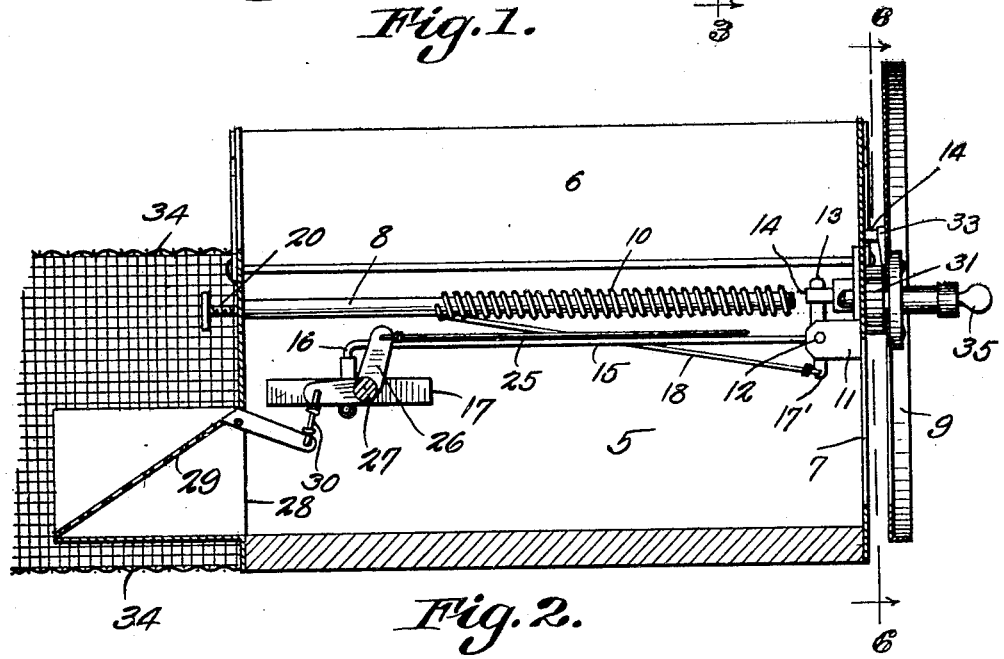
Figure 2 is a sectional view taken on line 2—2 of Figure 1.
Figure 3:
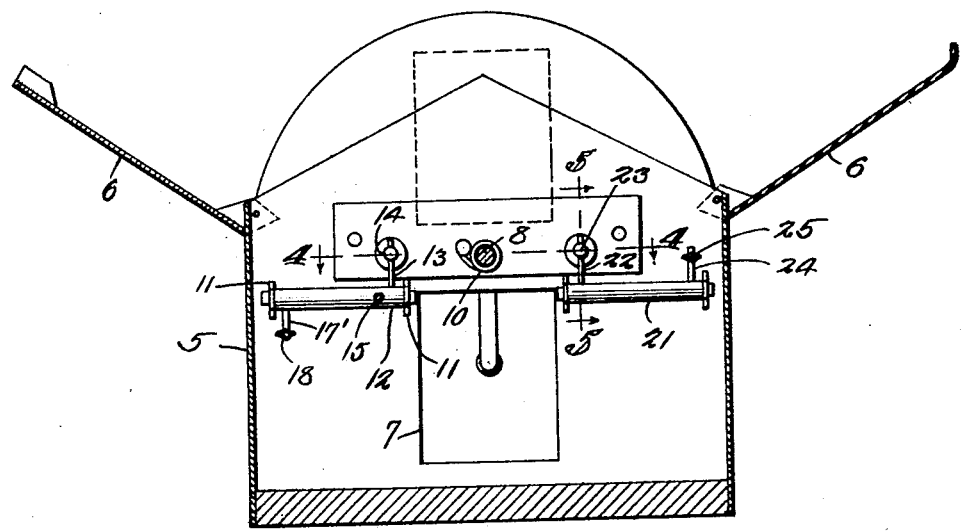
Figure 3 is a sectional view taken on line 3—3 of Figure 1.
Figure 4:
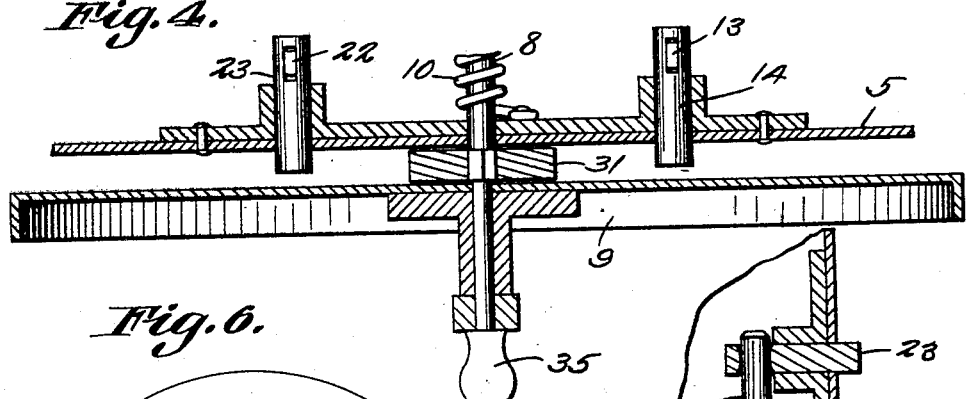
Figure 4 is a sectional view taken on line 4—4 of Figure 3.
Figure 6:
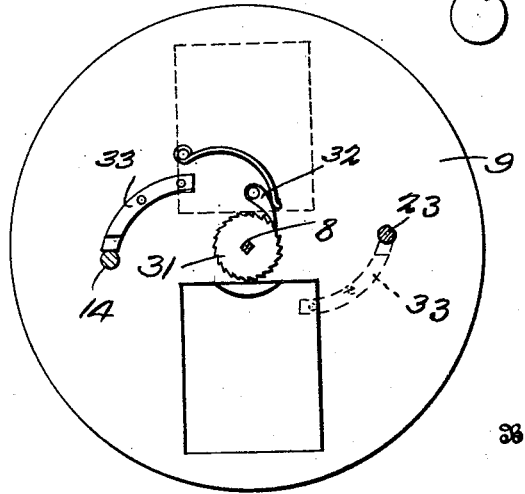
Figure 6 is a sectional view taken on line 6—6 of Figure 2.
Figure 5:
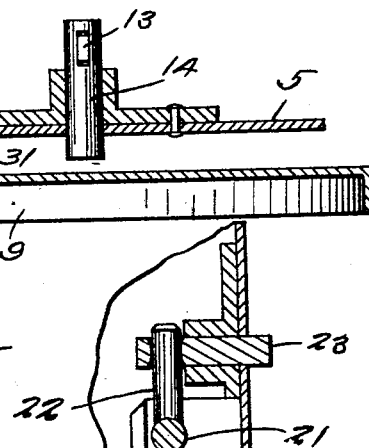
Figure 5 is a sectional view taken on line 5—5 of Figure 3.

Referring to the drawings in detail, the trap comprises a body portion indicated generally by the reference character 5, the same being preferably rectangular in formation, however, it is to be understood that the design and shape of the body portion may be changed, to meet various requirements.

The top of the body portion is open, and is closed by means of the closures 6 that are hingedly connected to the body portion, the closures being so constructed that the outer edge of one closure overlies the adjacent closure to provide a waterproof cover.

The front wall of the body portion is formed with an entrance opening 7, which may be of any desired shape. The reference character 8 designates a shaft that has its ends journaled in openings formed in the end walls of the body portion, the shaft being of a length to extend through the front end of the body portion, as clearly shown by the drawings.

Secured to the shaft 8, is a disk-like closure 9 which is formed with an opening adapted to register with the entrance opening 7, to allow animals to pass into the body portion. A coiled spring 10 is mounted on the shaft 8 and is adapted to normally hold the shaft under tension to rotate the shaft in a clockwise direction to rotate the closure and move it from its open to its closed position or vice versa.

Ears 11 extend inwardly from the front end wall of the body portion and are provided with openings to receive the ends of the shaft 12, to which the arm 13 is secured, the arm 13 extending through an opening in the pin 14, which passes through an opening formed in the front end wall of the body portion.

Connected with the shaft 12, is an arm 15 that extends to a point near the rear end wall of the body portion, where it is formed with a downwardly extended end portion 16 to which the bait pan 17 is connected. Thus it will be seen that as the bait pan is moved downwardly by an animal attempting to remove the bait therefrom, the shaft 12 is moved, drawing the pin 14 inwardly to its inactive position. Extending downwardly from the shaft 12 is an arm 17' to which the wire 18 is connected, which arm is formed with and opening to receive one end of the wire 18, that has its opposite end connected with the coiled spring 19.

A threaded shank 20 extends through the rear end wall of the body portion and has connection with one end of the coiled spring 19 so that the tension of the coiled spring may be adjusted to permit the operation of the shaft 12, under various degrees of pressure. At the opposite side of the entrance opening is a shaft 21 which is provided with an upstanding arm 22 that has connection with the pin 23, which pin extends through the front end wall of the body portion.

Extending upwardly from the shaft 21 is an arm 24 to which one end of the wire 25 is connected, the opposite end of the wire being connected with the bell crank lever 26 which is pivotally supported by means of the shaft 27.

An outlet opening indicated at 28 is formed in the rear end wall of the body portion and is normally closed by means of the vertically swinging closure 29 which is provided with a plurality of openings to allow the light rays to pass therethrough.

A link 30 connects the bell crank lever 26 and the closure 29, so that upward movement of the closure, will result in a downward movement of one end of the bell crank lever, drawing the pin 23 inwardly, for purposes to be hereinafter more fully described.

Mounted on the shaft 8, is a ratchet wheel 31 that cooperates with the pawl 32 that is secured to the disk-like closure 9, to the end that rotary movement of the shaft 8 in one direction, will operate to rotate the disk-like closure 9.

A stop 33 is mounted on the inner surface of the disk-like closure 9 and is adapted to engage the pins 14 and 23 which lie in the path of travel of the stop, to the end that the closure will be held in either its open or closed position, by the engagement between the pins and stop.

Forming a part of the trap, is a cage section 34 which has one of its ends open to the outlet opening 28, so that animals caught in the trap, may pass from the body portion 5 into the cage 34, where they are held captive.

In the operation of the trap, bait is placed in the bait pan 17 and the closure is moved to a position to allow animals to enter through the opening in the closure. An animal on entering the body portion of the trap, will, in an attempt to remove the bait from the bait pan, force the bait pan downwardly, resulting in the arm 15 being moved downwardly. As the arm 15 moves downwardly, the shaft 12 is rocked, pulling the pin 14 inwardly, out of engagement with the stop with which it is contacting, with the result that the shaft 8 is rotated, bringing the disk-like closure to its closed position.

The animal will now pass into the cage 34, elevating the closure 29 which results in the operation of the bell crank lever to rock the shaft 21. As the shaft 21 rocks, the pin 23 is pulled inwardly out of contact with the stop with which it is in engagement, allowing the closure to rotate to bring the opening thereof opposite to the entrance opening of the trap, to permit an animal to enter the trap. Due to this construction, it will be seen that an animal passing from the trap into the cage section thereof will reset the trap so that another animal may enter.

In order that the spring 10 may be placed under tension, an operating handle 35 is provided and is adapted to be positioned on the forward end of the shaft 8, which is shown as extending through the front end and cover of the body portion.

I claim:

1. A trap comprising a body portion, a cage communicating with the body portion at one end thereof, a rotary closure operating at one end of the body portion, means for rotating the closure, stops on the closure, sliding pins lying in the path of travel of the stops for stopping the closure in its open or closed position, means controlled by the action of an animal passing into the body portion for operating one of the sliding pins to release the closure to allow the closure to move to its closed position, and means controlled by the action of the animal passing into the cage, for releasing the closure to allow the closure to move to its open position.

2. A trap comprising a body portion, a cage connected with one end of the body portion and communicating therewith, a rotary member positioned at the front end of the body portion and having an opening to permit an animal to pass into the body portion, means controlled by the action of the bait pan for releasing the rotary member, means for moving the rotary member to its closed position, and means controlled by the action of an animal passing into the cage, for releasing the movable member, to move the movable member to its closed position.

3. A trap comprising a body portion, a cage at one end of the body portion and communicating with the body portion, a rotary closure at one end of the body portion for closing the body portion, stops on the closure, pins extending through one end of the body portion and lying in the path of travel of the stops, to hold the closure in its open or closed position, adjustable means for regulating the action of the pins, means controlled by the action of an animal passing into the cage, for releasing the closure and means for moving the closure to its open position.

4. A trap comprising a body portion, a cage secured at one end of the body portion and in communication therewith, a rotary closure at one end of the body portion, a spring for normally urging the closure in one direction to close or open the body portion, pins extending through one end of the body portion, stops on the closure to engage the pins to restrict movement of the closure, a rod connected with one of the pins and carrying a bait pan at one end thereof, said rod to be actuated by the action of an animal endeavoring to remove material from the pan, and means for restricting the movement of one of the pins.

In testimony that I claim the foregoing as my own, I have hereto affixed my signature.

BOWEN E. CLARKSON.